Nov. 27, 1962　　　W. MESSERSCHMITT　　　3,065,936
AIRCRAFT HAVING A POWER UNIT FOR THE GENERATION
OF LIFT FOR VERTICAL TAKE-OFF
Filed Oct. 19, 1960
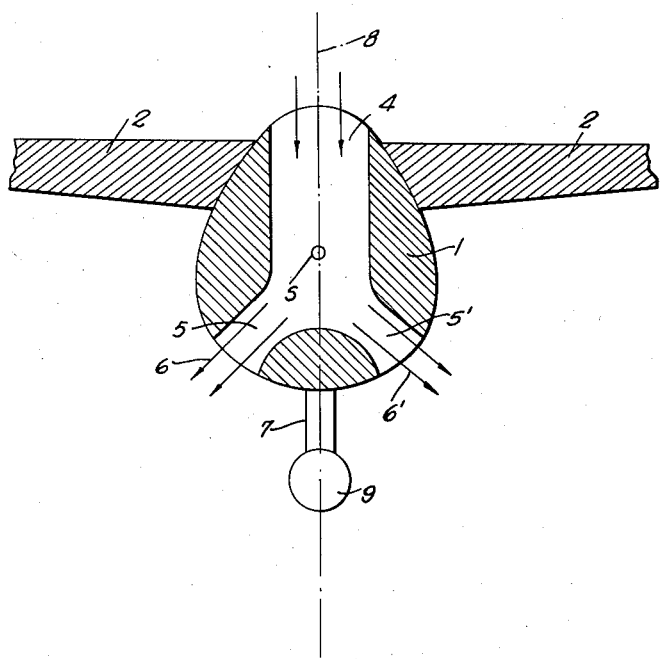
INVENTOR
W. Messerschmitt
BY
ATTORNEY

United States Patent Office 3,065,936
Patented Nov. 27, 1962

3,065,936
AIRCRAFT HAVING A POWER UNIT FOR THE GENERATION OF LIFT FOR VERTICAL TAKE-OFF
Willy Messerschmitt, Munich, Germany, assignor to Messerschmitt A.G., Augsburg, Germany, a company of Germany
Filed Oct. 19, 1960, Ser. No. 63,684
Claims priority, application Germany Oct. 20, 1959
3 Claims. (Cl. 244—23)

This invention relates to aircraft having a power unit for the generation of lift for vertical take-off.

Aircraft equipped with power units for the generation of lift for vertical take-off and landing are already known.

It is also known to build a lift generating power unit into the fuselage of the aircraft in the centre of gravity, or substantially in the centre of gravity thereof. Such an arrangement however has the drawback that the suspension of external loads from the fuselage under the centre of gravity is impossible, because this region is used for the emission of the jet of the power unit.

The present invention seeks to overcome this drawback.

In an aircraft equipped with a power unit located in the centre of gravity for the generation of lift the invention proposes to divide the jet emitted by the power unit into two or more symmetrical or mirror symmetrical components in such manner that the space immediately below the power unit will not be traversed by a jet and will therefore be available for the suspension of an external load under the fuselage.

The invention is illustrated by way of example in the accompanying drawing.

Approximately in the centre of gravity of a fuselage 1 which carries wings 2 in any conventional manner, is a built-in jet propulsion unit 4 which traverses the fuselage from top to bottom. As illustrated in the drawings, jet propulsion unit 4 includes an air intake 8 adjacent the top of fuselage 1, and is operative to produce a downwardly emerging jet of gases wherefore the overall arrangement is suitable for the generation of lift.

According to the invention, the downwardly emerging jet is divided adjacent the bottom of fuselage 1 by means of two jet pipes 5, 5' whereby two separate downwardly and outwardly directed component jets 6, 6' are emitted which do not traverse the space 7 immediately below the centre of gravity. It is therefore possible to suspend an external load 9 permanently or detachably from the fuselage 1 in the vertical axis which passes through the centre of gravity S.

Instead of two jet pipes 5, 5', more than two jet pipes can be provided and so arranged that the space 7 below the centre of gravity S is not traversed by a jet and remains available for the suspension of an external load 9 in the space 7 under fuselage 1.

I claim:

1. A vertical take-off aircraft having a jet propulsion unit mounted within the fuselage of said aircraft and adapted to produce a downwardly directed jet of gases emerging adjacent the bottom of said fuselage, and two pipes located under said unit for ducting said gases, said pipes being symmetrically and angularly disposed with respect to a vertical axis which passes through the center of gravity of the aircraft and being oriented to direct said jet downwardly and outwardly away from the space under said fuselage immediately below said center of gravity.

2. A vertical take-off aircraft having a jet propulsion unit mounted within the fuselage of said aircraft, said unit being located substantially at the center of gravity of said aircraft and traversing said fuselage substantially from the top to the bottom thereof, said unit including an air intake adjacent the top of said fuselage and comprising means adapted to produce a downwardly emerging jet of gases adjacent the bottom of said fuselage for generating lift, and duct means comprising a portion of said unit located adjacent the bottom of said fuselage below said air intake for dividing said downwardly emerging jet into a plurality of downwardly and outwardly directed component jets emerging substantially symmetrically from said fuselage below the center of gravity of said aircraft, said outwardly emerging jets each being directed at an angle to a vertical axis passing through the center of gravity of the aircraft and thereby being directed away from the space immediately below said jet propulsion unit whereby the bottom of said fuselage is available for the suspension of an external load substantially at the center of gravity of said aircraft notwithstanding the mounting of said unit within said fuselage substantially at said center of gravity.

3. The structure of claim 2 wherein said duct means comprises a plurality of outlet jet pipes angularly disposed with respect to one another about an axis passing through said air intake.

References Cited in the file of this patent

UNITED STATES PATENTS

| 1,838,354 | Bauer | Dec. 29, 1931 |
| 2,544,497 | Herrick | Mar. 6, 1951 |
| 2,885,159 | Ashwood | May 5, 1959 |

OTHER REFERENCES

Interavia, January 1960, pages 80–83.